United States Patent
Pu

(10) Patent No.: US 7,398,717 B1
(45) Date of Patent: Jul. 15, 2008

(54) CNC CENTRAL CUTTING AND TURNING MACHINE

(76) Inventor: Hung-Yen Pu, No.41, Alley68, Lane357, Sec.1, Xinan Rd., Wuri Shiang, Taichung County (TW)

( * ) Notice: Subject to any disclaimer, the term of this patent is extended or adjusted under 35 U.S.C. 154(b) by 67 days.

(21) Appl. No.: 11/783,026

(22) Filed: Apr. 5, 2007

(51) Int. Cl.
*B23B 3/06* (2006.01)

(52) U.S. Cl. ............................ 82/70.2; 82/130; 82/131; 82/142

(58) Field of Classification Search ................... 82/117, 82/70.2, 130, 131, 142, 150, 113
See application file for complete search history.

(56) References Cited

U.S. PATENT DOCUMENTS

| | | | | |
|---|---|---|---|---|
| 3,818,563 | A * | 6/1974 | Beaulieu ..................... 86/19.7 |
| 5,088,169 | A * | 2/1992 | Touzet ......................... 86/19.7 |
| 6,460,434 | B2 * | 10/2002 | Robb .......................... 82/1.11 |
| 6,533,506 | B1 * | 3/2003 | Hite ............................ 408/153 |
| 6,772,659 | B2 * | 8/2004 | Antoni et al. ................. 82/130 |

* cited by examiner

*Primary Examiner*—Willmon Fridie, Jr.
(74) *Attorney, Agent, or Firm*—Birch, Stewart, Kolasch & Birch, LLP

(57) ABSTRACT

The present invention provides a CNC central cutting and turning machine includes a holding head, wherein the rear end of the holding head has a holder, which can turn, mounted thereon, and the holder has at least three claws mounted thereon for jointly holding an object to turn; and a cutter holder for cutting the object, wherein the cutter holder has circular shape and is pivoted on a rear seat for turning, a central hole of the cutter holder is capable of accommodating the object therein, and the front side of the cutter holder has a lathe tool installed thereon. Through turning the object and also the lathe tool circling around the object, the speed for cutting the object can be significantly increased and also the cutting efficiency.

4 Claims, 3 Drawing Sheets

CNC CENTRAL CUTTING AND TURNING MACHINE

FIELD OF THE INVENTION

The present invention is related to a CNC cutting machine, and more particularly to a cutting machine whose object holder and cutter holder both can be turned to increase the cutting speed thereof.

BACKGROUND OF THE INVENTION

The conventional CNC central cutting machine, as shown in FIG. 1, includes a main machine whose left side of the top thereof has a holder 2, which can turn and is circular, mounted thereon for fixing an object to be cut. The top of the machine 1 tilts down from back to head and also has two sliding tracks 3 mounted thereon in a direction identical to the axial direction of the holder 2. The two sliding tracks 3 are jointly assembled with a sliding seat 4, which also tilts down from back to head, and the sliding seat 4 can slide along the sliding tracks 3 to move to the right side or left side. Further, the sliding seat 4 has a dovetail trough 5 mounted at the top thereof in a direction from back to head, and a cutter rear seat 6 is assembled in the dovetail trough 5 through the bottom thereof, so that the cutter rear seat 6 can move upward and downward along the dovetail trough 5. In addition, the cutter rear seat 6 has a cutter holder 7 mounted thereon in an axial direction and corresponding to the direction of the holder 2, wherein there are plural fixing holes 8 distributed on the circular and the longitudinal surfaces of the holder 7 for locking and fixing the object (not shown), so that when cutting, the holder 2 with the object can turns rapidly. Then, through upwardly and downwardly adjusting the position of the cutter rear seat 6, the cutter can correspond to the object, and through the dovetail trough 5 of the sliding seat 4 and the sliding tracks of the machine 1, the cutter rear seat 6 can gradually move toward the object, so that the cutter can cut or polish the surface of the object.

However, as cutting, the cutter only can provide one circle of cutting with a particular depth when the object turns once, so that the cutting speed is limited.

Consequently, the applicant keeps on carving unflaggingly through wholehearted experience and research to develop a CNC cutting machine, which can solve the inefficient problem in the prior art.

SUMMARY OF THE INVENTION

The object of the present invention is to provide a CNC central cutting and turning machine includes a holding head, wherein the rear end of the holding head has a holder, which can turn, mounted thereon, and the holder has at least three claws mounted thereon for jointly holding an object to turn; and a cutter holder for cutting the object, wherein the cutter holder has circular shape and is pivoted on a rear seat for turning, a central hole of the cutter holder is capable of accommodating the object therein, and the front side of the cutter holder has a lathe tool installed thereon. Through turning the object and also the lathe tool circling around the object, the speed for cutting the object can be significantly increased and also the cutting efficiency.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 2:
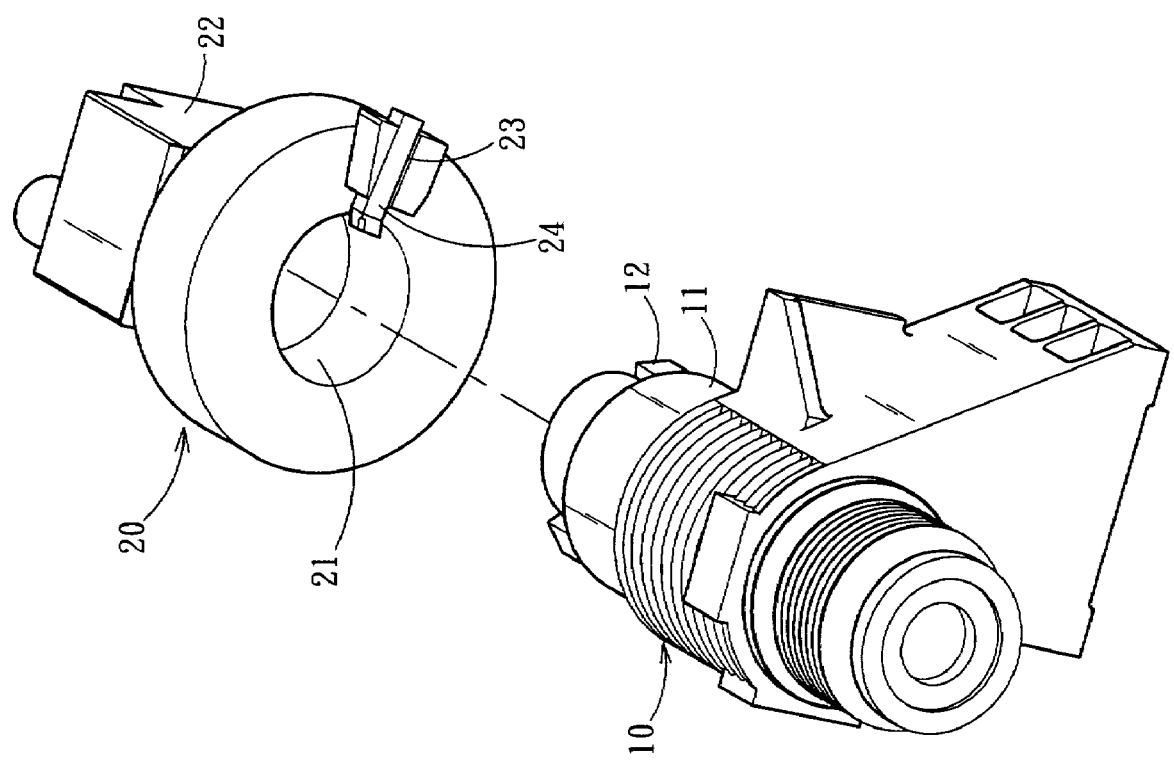
FIG. 2 is a three-dimensional drawing showing a conventional CNC central cutting and turning machine in a first embodiment according to the present invention.

Please refer to FIG. 2, in which a turning device of a CNC cutting machine according to the present invention includes:

An object holding head 10, wherein the holding head 10 has an object holder 11 mounted at the rear end thereof, the object holder 11 has at least three claws 12 mounted on the facets thereof, and each claw 12 can be moved toward the surrounding center thereof for jointly holding the object so that the object can be turned along with the object holder 11 at the rear end of the object holding head 10.

A cutter holder 20, wherein the cutter holder 20 has a central hole 21, which is circular, mounted at the central front end thereof corresponding to the object holding head 10, so that the cutter holder 20 has a ring shape, the rear end of the cutter holder 20 is pivoted on a rear seat 22 for free turning, the central hole 21 of the cutter holder 20 can accommodate the object therein, and the front side of the cutter holder 20 has a holding slot 23 mounted thereon for holding a lathe tool 24, whose cutting edge can cut or polish the outer surface of the object.

Through the structures described above, as operation, the claws 12 on the object holder 11 of the object holding head 10 can hold the object to turn, and the rear set 22 can move toward the object holding head 10, so that the object can go deep into the central hole 21 of the cutter holder 20. Then, through the claws 12 turning and the lathe tool 24 fixed at the front side of the cutter holder 20, the cutting edge of the lathe tool 24 can cut or polish the surface of the object along with the turning of the cutter holder 20.

Figure 3:
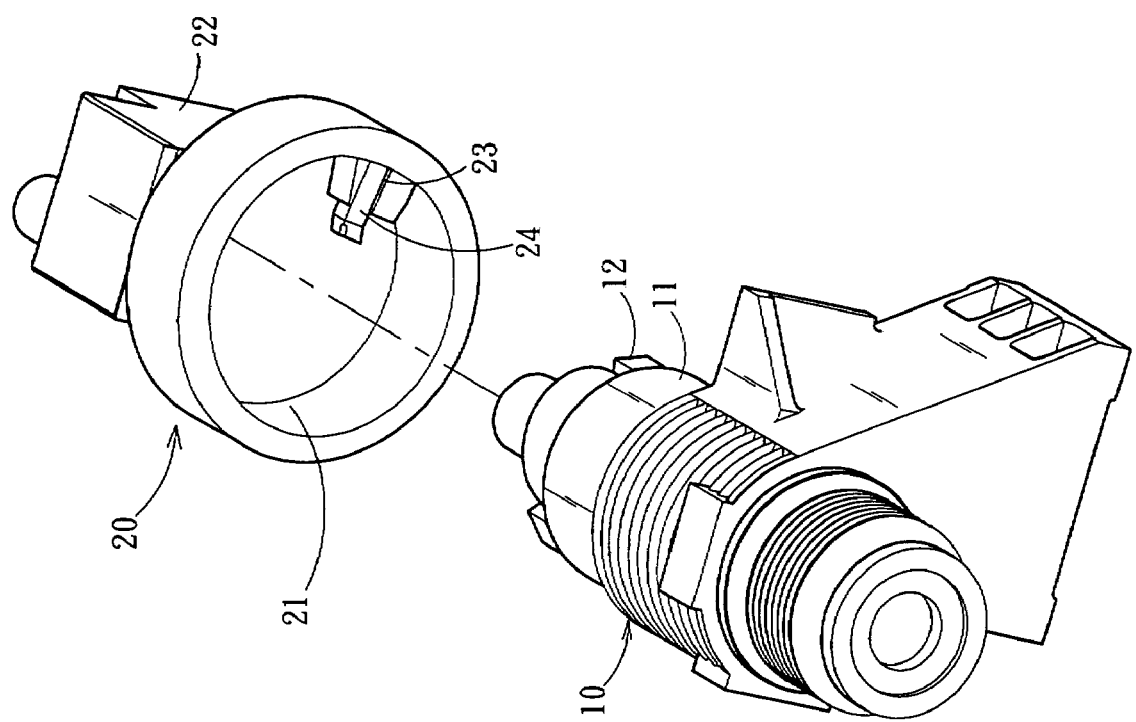
FIG. 3 is a three-dimensional drawing showing a conventional CNC central cutting and turning machine in a second embodiment according to the present invention.

Please further refer to FIG. 3 showing the second embodiment of the present invention. The lathe tool 24 is installed at the inner side of the central hole 21 of the cutter holder 20 and the cutting edge of the lathe tool 24 is extended into the central hole 20 for cutting or polishing the object, and also, the central hole 21 can accommodate the object to move therein.

Figure 1:
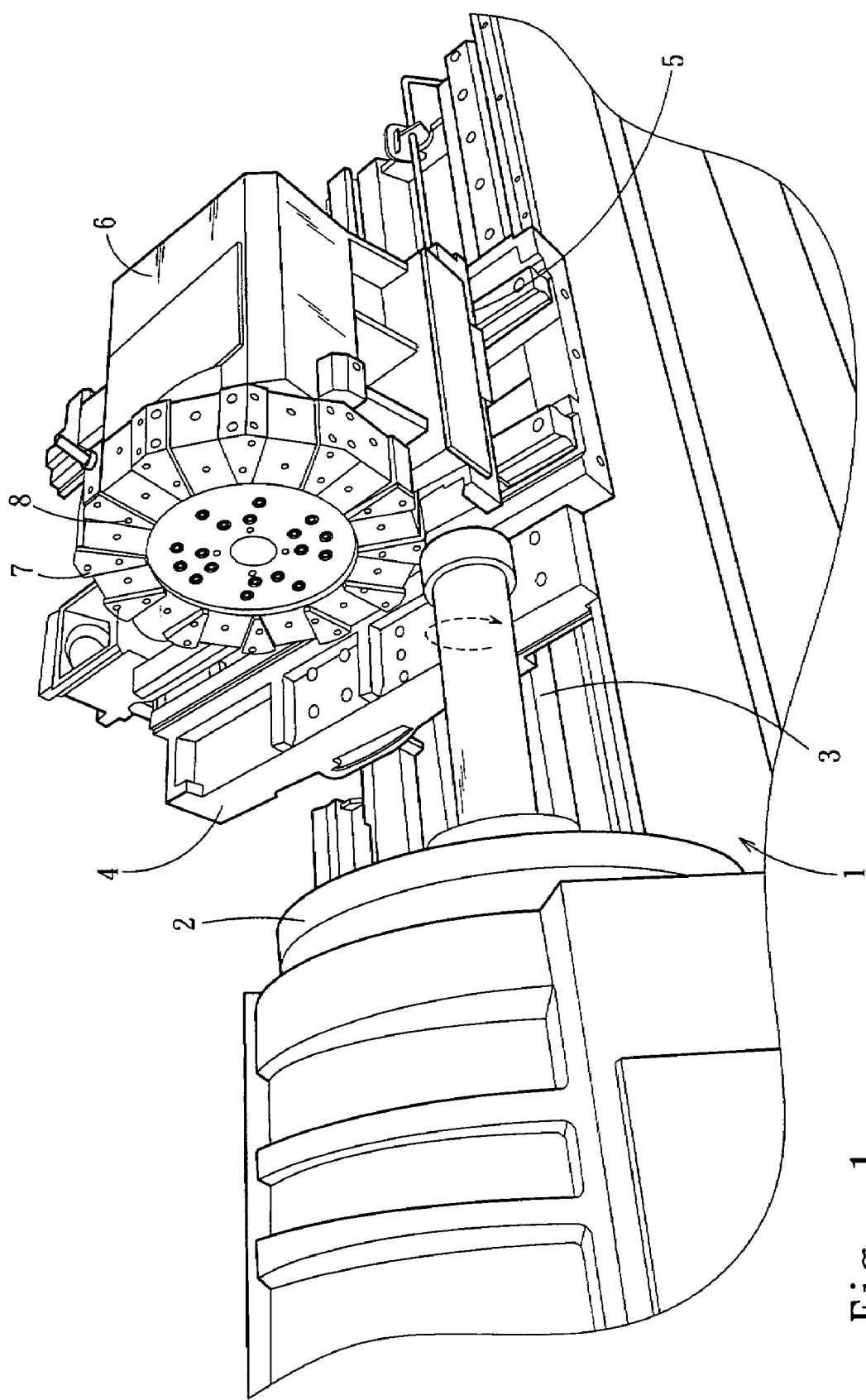
FIG. 1 is a three-dimensional drawing showing a conventional CNC central cutting machine.

Since, as the object turning, the lathe tool 24 also simultaneously circles around the surface of the object, the cutting speed can be significantly increased. As comparing to the conventional CNC cutting machine, as shown in FIG. 1, in which only the object holder 2 turns and the cutter only can cut or polish the object along with the forward and backward movements of the cutter seat 6, which means one turn of the object can only provide a particular depth of cutting or polishing, according to the present invention, the object turns and simultaneously, the lathe tool 24 circles around the object, so that the cutting speed can be significantly increased so as to reduce the cutting time and improve the cutting efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A CNC central cutting and turning machine, comprising:
   a holding head, wherein one end of the holding head has a holder, which turns, mounted thereon, the holder has at least three claws mounted thereon, and the three claws are capable of moving toward the surrounding center thereof for jointly holding an object;
   a cutter holder, wherein the cutter holder is pivoted on a rear seat for turning, the cutter holder has a central hole mounted at the center front end thereof corresponding to the holding head, and the central hole is capable of accommodating the object therein; and
   a lathe tool, which is installed at a front side of the cutter holder and whose cutting edge is corresponding to the surface of the object.

2. The CNC central cutting and turning machine as claimed in claim 1, wherein the cutter holder has a slot mounted at the front end thereof for holding the lathe tool.

3. The CNC central cutting and turning machine as claimed in claim 2, wherein the slot is mounted at the inner side of the central hole of the cutter holder.

4. The CNC central cutting and turning machine as claimed in claim 1, wherein the central hole of the cutter holder is circular so as to form the cutter holder to have a ring shape.

* * * * *